United States Patent
Zhao et al.

(10) Patent No.: US 7,378,369 B2
(45) Date of Patent: May 27, 2008

(54) NICKEL SUPPORTED ON TITANIUM STABILIZED PROMOTED CALCIUM ALUMINATE CARRIER

(75) Inventors: Shizhong Zhao, Louisville, KY (US); Yeping Cai, Louisville, KY (US); Jurgen Ladebeck, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 495 days.

(21) Appl. No.: 10/806,259

(22) Filed: Mar. 22, 2004

(65) Prior Publication Data

US 2004/0180786 A1    Sep. 16, 2004

Related U.S. Application Data

(63) Continuation-in-part of application No. 10/206,547, filed on Jul. 26, 2002, now abandoned.

(51) Int. Cl.
  *B01J 23/00* (2006.01)
  *B01J 21/00* (2006.01)
  *B01J 20/00* (2006.01)

(52) U.S. Cl. .............. 502/327; 502/328; 502/335; 502/337; 502/341; 502/350; 502/415; 502/439

(58) Field of Classification Search ............... 502/327, 502/328, 335, 337, 341, 350, 351, 415, 439
  See application file for complete search history.

(56) References Cited

U.S. PATENT DOCUMENTS

| | | | | |
|---|---|---|---|---|
| 3,931,053 A | * | 1/1976 | Kazakov et al. | 502/328 |
| 4,101,449 A | * | 7/1978 | Noda et al. | 502/250 |
| 4,337,178 A | * | 6/1982 | Atwood et al. | 502/328 |
| 4,388,877 A | * | 6/1983 | Molayem et al. | 44/604 |
| RE32,044 E | * | 12/1985 | Atwood et al. | 502/335 |
| 4,906,603 A | * | 3/1990 | Burgfels et al. | 502/328 |
| 4,988,661 A | * | 1/1991 | Arai et al. | 502/327 |
| 5,041,408 A | * | 8/1991 | King et al. | 502/328 |
| 5,356,851 A | * | 10/1994 | Sarrazin et al. | 502/185 |
| 5,773,589 A | * | 6/1998 | Shoji et al. | 502/328 |
| 6,242,380 B1 | * | 6/2001 | Park et al. | 502/337 |
| 6,261,465 B1 | * | 7/2001 | Hancock | 210/763 |
| 6,693,060 B2 | * | 2/2004 | Park et al. | 502/337 |

\* cited by examiner

*Primary Examiner*—Cam N. Nguyen
(74) *Attorney, Agent, or Firm*—J. L. Simunic

(57) ABSTRACT

A calcium-promoted alumina supported nickel reforming catalyst stabilized with titanium is disclosed. The catalyst is particularly useful for reforming reaction in feed streams containing significant quantities of CO and $CO_2$, low quantities of steam (the feed stream having a $H_2O/CH_4$ of less than 0.8 and a $CO_2/CH_4$ of greater than 0.5) and relatively high quantities of sulfur compounds (up to about 20 ppm). The catalyst comprises from about 25 wt % to about 98 wt % alumina as a support, from about 2 wt % to about 40 wt % nickel oxide, which is promoted with from about 0.5 wt % to about 35 wt % calcium oxide, and which is stabilized with from about 0.01 wt % to about 20 wt % titanium, wherein the calcium oxide is combined with the alumina to form calcium aluminate. The catalyst can be used in reforming reactions to produce syngas and has advantages in producing low hydrogen to carbon monoxide ratio syngas for applications such as iron ore reduction.

10 Claims, No Drawings

NICKEL SUPPORTED ON TITANIUM STABILIZED PROMOTED CALCIUM ALUMINATE CARRIER

CROSS-REFERENCE TO RELATED APPLICATIONS

The present application is a continuation in part to U.S. application Ser. No. 10/206,547 filed on Jul. 26, 2002 now abandoned and incorporated herein in its entirety by reference.

BACKGROUND OF THE INVENTION

1. Field of Invention

This invention relates to a highly active catalyst useful for syngas generation, and more particularly to a calcium promoted, nickel catalyst on an alumina support, wherein the catalyst is stabilized by the addition of titanium. The catalyst is highly active and resistant to coking especially in a feed stream containing significant quantities of CO and $CO_2$, relatively low quantities of steam, and, optionally, relatively high quantities of sulfur compounds. A process of manufacture of the catalyst and a process of use of the catalyst are also disclosed.

2. Background Art

Production of synthesis gas or syngas (various blends of gases generally comprising hydrogen and carbon monoxide) is an important process step in the manufacture of numerous chemicals, such as ammonia and methanol. It is also useful in numerous other commercial processes, such as iron ore reduction, Fischer-Tropsch synthesis and gas-to-liquid technology. Many of the synthesis gas plants produce the syngas by steam reforming hydrocarbons. Typically, these plants employ a process of catalytic steam reforming of methane in the presence of a supported nickel catalyst, usually nickel on an alumina support or nickel on a promoted alumina support.

However, the presence of sulfur compounds in the reforming system, for example, quantities of $H_2S$ as low as several parts per billion, can deactivate conventional steam reforming catalysts. Therefore, sulfur is usually removed before being allowed to enter the reformer. In a reducing gas generation process, the feed may include a significant amount of sulfur or sulfur compounds, and the catalysts need to retain sufficient high reforming activity at sulfur levels up to about 20 parts per million. While higher temperatures and $H_2$ partial pressures in the reaction feed can reduce the level of deactivation, these higher temperatures may also adversely affect the physical structure of the steam reforming catalysts.

Another problem that often occurs with reforming reactions is an enhanced likelihood of coking or carbon formation on the catalysts. In conventional reforming processes, there is essentially no CO in the feed stream. In contrast, in reducing gas generation processes, the low $H_2O$ and high CO and $CO_2$ conditions make coking of the reforming catalysts a problem. Carbon formation from CO at the inlet section of the reformer in the reducing gas generation process is especially critical. On nickel catalysts the effect of this coking is coating of the active nickel sites and plugging of the pores of the catalyst.

Several solutions have been proposed to address the coking problem. For example, manufacturers have used a large excess of $H_2O$ in the reformer feed stream, but this is not suitable for reducing gas generation processes. U.S. Pat. No. 5,753,143 proposes the use of a noble metal catalyst. It is well known that noble metal catalysts have higher coke formation resistance compared to conventional steam reforming catalysts that merely utilize nickel, but these noble metal catalysts are quite expensive, especially with the large quantity of catalysts that is conventionally utilized for this type of reaction. Morioka has addressed the coking problem by the use of high dispersion of metal species over the surface of the catalyst, such as various types of double hydroxide catalysts. U.S. Pat. No. 4,530,918 teaches a nickel on alumina catalyst with a lanthanum additive.

Another process for limiting coke formation on nickel catalysts during reforming reactions utilizes the sulfur that is naturally present in the feed stream. In this process— referred to as passivation—sulfur poisons some, but not all, of the nickel sites on the catalyst and produces a reforming catalyst which retains sufficient active sites to be useful for gas production at lower $H_2$/CO ratios. The amount of sulfur that is present in the feed stream must be carefully controlled so that the catalyst retains sufficient activity for the reforming reaction, and the process often requires a substantial quantity of catalyst in the bed.

Conventional steam reforming nickel on alumina catalysts may include additives to enhance their performance and to reduce the coking problem. For example, alkali compounds may be added to steam reforming catalysts to reduce carbon formation but because of their potential migration during high temperature processing the alkali metals can adversely impact downstream operations. Magnesia has also been added to steam reforming catalysts to suppress carbon formation, but magnesia promoted catalysts are hard to reduce and maintain in a reduced state.

Nickel oxide and magnesia are very similar in structure. Thus, a nickel oxide and magnesia combination material is usually formed during the high temperature reaction. The reducibility of nickel oxide and the activity of a magnesia-based catalyst is heavily dependent on the calcination temperature and opertion conditions, with a less active catalyst resulting when the calcination temperature is higher than 400° C. and in a less reducing environment. Thus, magnesia-supported nickel catalysts are difficult to utilize for reforming reactions, especially—for reducing gas generation.

A nickel catalyst for reducing gas generation is conventionally produced by impregnating nickel on an alumina or magnesia carrier. In use because the reforming reaction is a strongly endothermic reaction and in order to obtain high hydrocarbon conversion, high temperatures are required for the reaction, sometimes running as high as 1000° C. Even when the reaction is conducted at lower temperatures, in the range of 700° C., it is still necessary to use low surface area alumina, such as alpha alumina as the carrier material for these catalysts. In fact, alpha alumina is the only alumina phase that is stable enough to be used as a carrier under conventional reforming conditions. With catalysts produced from alpha alumina carriers, however, the BET surface area, pore volume and nickel dispersion on these catalysts is quite low. For example, a conventional steam reforming catalyst of this type prepared with nickel on alpha alumina has a BET surface area in the range of 1-4 $m^2$/g, a pore volume from about 0.08 to 0.16 cc/gm and a nickel specific surface area from about 0.5 to 1.5 $m^2$/g.

While lanthanum-promoted alumina catalysts of U.S. Pat. No. 4,530,918 have shown some advantages in the production of carbon monoxide rich syngas at close to stoichiometric requirements, the surface area and nickel dispersion of these catalysts is still in a range comparable to conventional alpha alumina-based steam reforming catalysts with BET surface areas only slightly improved to about 5 $m^2$/gm with a nickel specific surface area less than 2 $in^2$/g.

Thus, there is still a need to improve existing nickel on alumina catalysts for reforming reactions utilizing a feed stream containing significant quantities of CO and $CO_2$ and low quantities of steam (the feed stream having a $H_2O/CH_4 < 0.8$ and a $CO_2/CH_4 > 0.5$). Further, the addition of additives to these catalysts has not to date shown sufficient satisfactory results to overcome the coking problems while maintaining high reforming activity in the presence of a significant amount of sulfur.

SUMMARY OF THE INVENTION

The invention is a calcium promoted, alumina supported, nickel reforming catalyst stabilized with titanium, especially for use in feed streams containing significant quantities of CO and $CO_2$, low quantities of steam (the feed stream having a $H_2O/CH_4$ of less than 0.8 and a $CO_2/CH_4$ of greater than 0.5) and, optionally, relatively high quantities of sulfur compounds (up to 20 ppm). The catalyst comprises from about 25 wt % to about 98 wt % alumina as a support, and from about 2 wt % to about 40 wt % nickel oxide, which is promoted with from about 0.5 wt % to about 35 wt % calcium oxide, and which is stabilized with from about 0.01 wt % to about 20 wt % titanium, wherein the calcium oxide is combined with the alumina to form calcium aluminate.

The invention further comprises a process for the production of a stabilized calcium promoted, alumina supported nickel reforming catalyst for use in feed streams containing significant quantities of CO and $CO_2$, low quantities of steam (the feed stream having a $H_2O/CH_4 < 0.8$ and a $CO_2/CH_4 > 0.5$) and, optionally, relatively high quantities of sulfur compounds. The production process comprises combining an aluminum compound with a calcium oxide additive to form a mixture, forming the mixture into a desirable shape, preferably pellets containing one or multiple holes, treating the formed mixture with steam, calcining the steamed, formed product at a temperature from about 900° C. degrees to about 1700° C. degrees to form the catalyst precursor, impregnating the catalyst precursor with a nickel salt solution, and drying and calcining the impregnated material to form the calcium promoted, alumina supported nickel catalyst. The stabilizer may be added, without limitation, with the calcium oxide, or after heat treatments, or at the time of nickel addition.

DETAILED DESCRIPTION OF THE INVENTION

The present invention is a highly active, coke resistant nickel catalyst especially useful in feed streams containing at least 15 mole percent (and more typically 18-20 mole percent) of hydrocarbons, low quantities of $H_2O$ (less than about 20 mole percent and preferably less than about 15 mole percent), significant quantities of CO and/or $CO_2$ (at least 20 mole percent of CO + $CO_2$, and typically more than 30 mole percent of CO + $CO_2$), and, optionally, relatively high quantities of sulfur (up to about 20 ppm). The balance of the feed stream is hydrogen. The catalyst is a calcium oxide promoted, alumina supported, nickel catalyst that is stabilized with titanium. The catalyst of the invention has a considerably higher BET surface area and nickel specific surface area and greater pore volume than conventional alumina-supported nickel catalysts such as those used for conventional reducing gas generation reactions.

The precursor for the catalyst of the invention is prepared by combining a calcium compound promoter with an aluminum compound carrier material. An exemplary composition of the precursor comprises from about 0.5 wt % to about 25 wt % and more preferably from about 2 wt % to about 16 wt % calcium, preferably in the form of calcium oxide or calcium hydroxide. Combined with the calcium compound promoter as the carrier of the catalyst is from about 25 wt % to about 98 wt % of an aluminum compound, wherein an exemplary composition comprises alumina or aluminum hydroxide or alpha alumina. The calcium compound used as the precursor of calcium includes but is not limited to calcium carbonate, calcium oxide, any forms of calcium aluminates, calcium nitrate, and calcium hydroxides, preferably calcium carbonate, calcium oxide, calcium hydroxides, and calcium aluminates. The aluminum compound used as the precursor of aluminum includes but is not limited to aluminum oxide, aluminum hydroxide, aluminum nitrate, any forms of calcium aluminates, and any organic forms of aluminum, preferably aluminum oxide and aluminum hydroxide.

The precursor material is formed such that the calcium compound promoter is combined with the aluminum compound carrier to form various calcium and aluminum combinations, such as hibonite ($CaO \cdot 6Al_2O_3$) and other calcium aluminates, such as $CaO \cdot 2Al_2O_3$ and $CaO \cdot Al_2O_3$. Any stable calcium aluminate can be utilized. However, preferably, no free calcium oxide is detectable in the precursor by x-ray diffraction after the formation of the catalyst.

The precursor is formed by conventional procedures. Appropriate quantities of solid alumina and/or aluminum hydroxide are mixed with calcium aluminate cement, calcium oxide and/or calcium hydroxide. The mixture is then blended with graphite and water to form granules. The granules are then formed into any desirable shape, such as tablets, using a tabletting machine. An exemplary shape, without limitation, for the tablets is cylindrical with one or multiple holes, for example, five to ten holes extending through each tablet. The formed tablets are then treated in a reactor under steam pressure up to 150 psig for about 4 to 24 hours. After steaming, the tablets are calcined to a temperature of about 250° C. to about 1700° C. for from about 6 hours to about 36 hours to remove moisture and to develop ceramic bonds to form the calcium aluminates through a solid state reaction. The resulting calcium-promoted, alumina carrier has a BET surface area of at least about 2 $m^2$/gram and a pore volume, measured by mercury penetration, of at least about 0.30 cc/gram.

After the calcium aluminate precursor material is formed, nickel is loaded onto the precursor by impregnation of the precursor material with a nickel salt solution. The precursor may be impregnated by any means known in the art, for example, the precursor can be immersed in a nickel salt solution, such as nickel nitrate, and then dried and calcined at a temperature from about 350° C. to about 650° C. for from about 1 hour to about 5 hours to transform the nickel nitrate to nickel oxide. The impregnation step may be repeated until the target nickel loading level is reached. For a reforming catalyst, the recommended nickel oxide loading on the precursor is from about 2 wt % to about 30 wt %, and more preferably from about 3 wt % to about 20 wt % nickel oxide.

The catalyst further includes titanium, added as a stabilizer. The titanium may be delivered as a titanium-inclusive compound—the titanium precursor—such as, without limitation, titanium oxide, titanium hydroxide, titanium metal, and any organic form of titanium, preferably titanium oxide and titanium hydroxide. The titanium may be added to the catalyst, without limitation, with the calcium oxide, or after heat treatments, or at the time of nickel addition.

Because of the presence of calcium aluminate as a component of the precursor, the catalyst has a substantially larger surface area and greater pore volume than conventional nickel on alumina steam reforming catalysts. The BET surface area of the calcium-promoted catalyst is at least about 4 m$^2$/g, preferably from about 6 m$^2$/g to about 30 m$^2$/g. The nickel specific surface area on the catalyst, measured by hydrogen chemisorption at room temperature, is greater than about 2 m$^2$/g and preferably greater than 4 m$^2$/g. In addition, the pore volume of the calcium-promoted nickel catalyst is greater than about 0.2 cc/g, whereas the typical pore volume for conventional art nickel on alumina steam reforming catalysts is only about 0.08 to 0.15 cc/g. The calcium promotion also permits a better nickel dispersion on the catalyst body (as determined by using H$_2$ chemisorption for nickel specific surface area).

The catalyst of the invention is especially useful for reforming reactions where the feed stream contains at least 15 mole percent (and more typically 18-20 mole percent) of hydrocarbons, a low quantity of steam (less than about 20 mole percent, and preferably less than about 15 mole percent), significant quantities of CO and CO$_2$ (at least 20 mole percent of CO+CO$_2$ and typically more than 30 mole percent of CO+CO$_2$), and, optionally, a relatively high quantity of sulfur compounds (greater than 0.1 ppm, and even up to about 20 ppm). The feed stream preferably has a H$_2$O/CH$_4$ of less than 0.8 and a CO$_2$/CH$_4$ of greater than 0.5.

The catalyst of the invention also operates well in conditions where carbon formation is thermodynamically possible as the catalysts exhibits higher carbon formation resistance than prior art nickel steam reforming catalysts. This catalyst is especially designed for use in reforming reactions which are not conventional steam-reforming reactions, such as for use in iron ore reduction, the production of methanol, Fischer-Tropsch synthesis and gas to liquid technology. These applications require a significantly lower ratio of H$_2$:CO and are therefore significantly different from a conventional steam reforming application.

In order to illustrate the present invention and advantages thereof, the following examples are provided. It is understood that these examples are illustrative and do not provide any limitation on the invention. In particular, it is important to understand that the present invention is generally applicable to reforming reactions where the feed stream contains low quantities of steam and high quantities of carbon dioxide (H$_2$O/CH$_4$<0.8, CO$_{2/CH4}$>0.5), but may contain relatively high quantities of sulfur compounds. The present invention is also generally applicable to use where the temperature of the reaction may subject conventional catalysts to form coke.

EXAMPLE 1

A catalyst carrier is prepared by blending about 36.29 kg of aluminum hydroxide and 11.24 kg of calcium aluminate cement with 6.2 kg distilled water and 2.7 kg graphite. The mixture is then tabletted, autoclaved at 20-100 psig for about 10 hours, and calcined for about 8 hours at 120° C.-400° C. followed by calcining for about 5 hours at 1250° C.-1350°precursor is determined to contain 5.7 wt % calcium oxide with the balance being alumina. The precursor is then analyzed under x-ray diffraction and discovered to be comprised of major phases of alpha alumina, hibonite (CaO.6Al$_2$O$_3$), and calcium aluminate (CaO.2Al$_2$O$_3$). Trace amounts of monoalumina calcium aluminate (CaO.Al$_2$O$_3$) are also present. However, there is no detectable free calcium oxide. The precursor has a BET surface area of 2.5 m$^2$/g and a pore volume (measured by mercury penetration method) of 0.45 cc/g. The precursor carrier is then impregnated with a nickel nitrate solution containing about 15 wt % nickel. The impregnated precursor is then calcined for about 2 hours at 400° C.-600° C. After calcination, the impregnation and calcination procedures are repeated twice for a total of three impregnations and three calcinations. The finished catalyst contains 13.3 wt % nickel. The physical and performance characteristics of the catalyst are reported in Table 1.

EXAMPLE 2

A catalyst is prepared as disclosed in Example 1 except the mixture comprises 100 kg of aluminum hydroxide, 10.9 kg of calcium hydroxide, 38.1 kg of calcium aluminate cement and 9.1 kg of graphite, and the resulting precursor has a 17.2 wt % loading of calcium oxide with the balance being alumina. The major phases of the precursor are determined to be calcium aluminate and alpha alumina with no free calcium oxide detectable. Sufficient nickel nitrate is then impregnated onto the precursor to yield a nickel loading, after calcination, of 15.8 wt %. The physical characteristics and performance characteristics of this catalyst are disclosed in Table 1.

EXAMPLE 3

A catalyst is prepared as disclosed in Example 1 except sufficient potassium carbonate is added to produce a precursor having a 16.8 wt % calcium oxide loading and a 2.0 wt % potassium oxide loading. A precursor is initially blended, tabletted, autoclaved and calcined at 120° C.-400° C. as in Example 1. The potassium carbonate is then added, and the material is calcined for about 8 hours at 120° C.-400° C. followed by calcining for about 5 hours at 1250° C.-1350° C. The major phases of the precursor are determined to be calcium aluminate and alpha alumina with no free calcium oxide detectable. When the precursor is analyzed by x-ray diffraction, a small percentage of potassium aluminate KAl$_{11}$O$_{17}$ is also determined to be present. Sufficient nickel nitrate is impregnated onto the precursor to yield a nickel loading, after calcination, of 17.1 wt %. The physical characteristics and performance characteristics of this catalyst are disclosed in Table 1.

COMPARATIVE EXAMPLE 4

A catalyst carrier is prepared by blending 100 kg alumina powder with 400 kg water in a mixer to make a slurry. The slurry is spray dried at a temperature of 120° C. to 370° C. About 1 kg aluminum stearate powder is then added to the mixture and the mixture is tabletted and calcined at 1500° C.-1600° C. for about 5 hours. The tablets are then impregnated with sufficient nickel nitrate to yield a nickel loading, after calcination, of 14.8 wt %. The physical characteristics and performance characteristics of this catalyst are disclosed in Table 1.

EXAMPLE 5

A catalyst precursor carrier is prepared as disclosed in Example 1 except 0.52 kg of titanium oxide is added to the aluminum hydroxide, calcium aluminate cement, and graphite mixture to result in a 1.47 weight percent titanium oxide (or 0.88 weight percent of titanium) loading on the calcined catalyst precursor. The procedures of blending, tabletting, autoclaving, drying, calcination, and impregnation are exactly the same as in Example 1. The titanium-stablized calcium aluminate precursor is then impregnated with a Ni(NO$_3$)$_2$ solution to give 9.6 wt % Ni loading after the nitrate was decomposed. The physical characteristics and performance characteristics of this catalyst are disclosed in Table 1.

EXAMPLE 6

A catalyst is prepared by blending about 36.29 kg of aluminum hydroxide and 11.24 kg of calcium aluminate cement with 6.2 kg distilled water and 2.7 kg graphite and about 0.70 kg La$_2$(CO$_3$)$_3$ and about 0.67 kg TiO$_2$. The mixture is then tabletted, autoclaved at 20-100 psig for about 10 hours, and calcined for about 8 hours at 120° C.-400° C. followed by calcining for about 5 hours at 1250° C.-1350° C. Sufficient nickel nitrate is then impregnated onto the precursor to yield a nickel loading, after calcination, of 8.1 wt %. The resulting catalyst comprises about 0.79 wt % La and about 0.92 wt % Ti. The physical and performance characteristics of the catalyst are reported in Table 1.

EXAMPLE 7

A catalyst carrier is prepared by blending 36.29 kg of aluminum hydroxide, 0.52 kg of titanium oxide, and 11.24 kg of calcium aluminate cement with 6.2 kg distilled water and 2.7 kg graphite, and then the mixture is tabletted. The tabletted precursor is autoclaved, dried, and then impregnated with La$_2$(CO$_3$)$_3$ solution to yield, after calcination, a lanthanum loading of 2.0 wt % and a titanium loading of 0.88 wt %. The lanthanum-impregnated calcium aluminate precursor is calcined at about 1300° C. for about 5 hours. The tablets are then impregnated with a Ni(NO$_3$)$_2$ solution to give 10.3 wt % Ni loading after the nitrate was decomposed. The physical characteristics and performance characteristics of this catalyst are disclosed in Table 1.

TABLE 1

| Sample | PV (cc/g) | SA (m$^2$/g) |
| --- | --- | --- |
| 1 | 0.28 | 8.0 |
| 2 | 0.24 | 14.5 |
| 3 | 0.24 | 26.6 |
| 4 | 0.12 | 33 |
| 5 | 0.33 | 6.5 |
| 6 | 0.37 | 17.0 |
| 7 | 0.40 | 7.4 |

TESTING PROCEDURES

The activity of each catalyst is tested in a tubular reactor system. The catalyst is first reduced and then tested at a gas hour space velocity (GHSV) of about 100,000/h. The catalyst particles, having a typical size of about 5×7 mesh, are placed in a catalyst bed to test their performance in reforming a hydrocarbon feed stream. The feed stream consists of about 19% CO, 18% CH$_4$, 14% CO$_2$, 13% H$_2$O, 35% H$_2$ (all mole basis) and 2 parts per million H$_2$S. The H$_2$O/CH$_4$ ratio is 0.74 and the CO$_2$/CH$_4$ ratio is 0.79. Due to the high GHSV, the reformed gas does not reach thermal dynamic equilibrium even at 1500° F. (815.5° C.). A typical reformed gas has an H$_2$/CO ratio of 1.8.

The carbon formation resistance of each catalyst is tested in a pressurized reaction as carbon formation is more pronounced at elevated pressures. The test temperature is at 1000° F. (537.8° C.) at the inlet and 1500° F. (815.5° C.) at the outlet of the catalyst bed. N-hexane is used as the feed for the hydrocarbon. 300 cc of catalyst sized to 12×16 mesh are used as the testing media. Reforming is carried out at 350 psig (24.1 bars) by decreasing the steam to carbon ratio at a theoretical hydrogen space velocity of 3,167/h from 6.0 until carbon formation is detected. The pressure differentiation between the inlet and the outlet of the reactor is measured. As the steam to carbon ratio decreases, carbon formation occurs and significant pressure differential is observed.

The catalyst of the present invention has an improved activity index and higher resistance to carbon formation than a conventional nickel on alumina catalyst. Further, the stabilized catalysts of the present invention demonstrate activity for a longer period of time than the conventional nickel on alumina catalyst or the nickel on calcium alumina catalyst. After about 250 hours on stream, activity of Ni/Ca—Al and Ni/Al is almost the same, but with the addition of a titanium stabilizer the activity of the Ni/Ca—Al catalyst is increased by about 20%.

It is understood that variations may be made which would fall within the scope of this development. For example, although the catalysts of the present invention are intended for use as reforming catalysts for use in feed streams containing significant quantities of CO and CO$_2$, low quantities of steam and relatively high quantities of sulfur compounds, it is anticipated that these catalysts could be used in other applications requiring reforming catalysts. The scope of the present invention can only be limited by the appended claims.

The invention claimed is:

1. A reforming catalyst for use in feed streams containing steam, CO$_2$, and CO at levels such that the H$_2$O/CH$_4$ is less than 0.8 and the C$_2$O/CH$_4$ is greater than 0.5, the feed stream further containing relatively high quantities of sulfur compounds, wherein said catalyst comprises from about 0.5 wt % to about 25 wt % of a calcium compound additive, from about 2 wt % to about 30 wt % nickel, from about 25 wt % to about 98 wt % of an aluminum compound carrier, and from 0.01 wt % to 20 wt % of titanium, and wherein said catalyst has a pore volume greater than about 0.2 cc/g.

2. The catalyst of claim 1 wherein the calcium compound combined with the aluminum compound comprises calcium aluminate.

3. The catalyst of claim 1 wherein the amount of free calcium oxide present in the catalyst is not detectable by x-ray diffraction.

4. The catalyst of claim 1 wherein the calcium compound comprises from about 2 wt % to about 16 wt % of the catalyst.

5. The catalyst of claim 1 wherein the nickel comprises from about 2 wt % to about 20 wt % of the catalyst.

6. The catalyst of claim 1 having a BET surface area greater than about 4 m$^2$/g.

7. The catalyst of claim 1 having a BET surface area from about 6 m$^2$/g to about 30 m$^2$/g.

8. The catalyst of claim 1 having a nickel specific surface area greater than about 2 m$^2$/g.

9. The catalyst of claim 1 having a nickel specific surface area greater than about 4 m$^2$/g.

10. The catalyst of claim 1 wherein the titanium comprises from 0.1 wt % to 10 wt % of the catalyst.

* * * * *